July 10, 1951     H. W. HAPMAN     2,559,616
PRESSURE-SEALING APPARATUS FOR FLIGHT CONVEYERS
Filed July 2, 1949     2 Sheets-Sheet 1
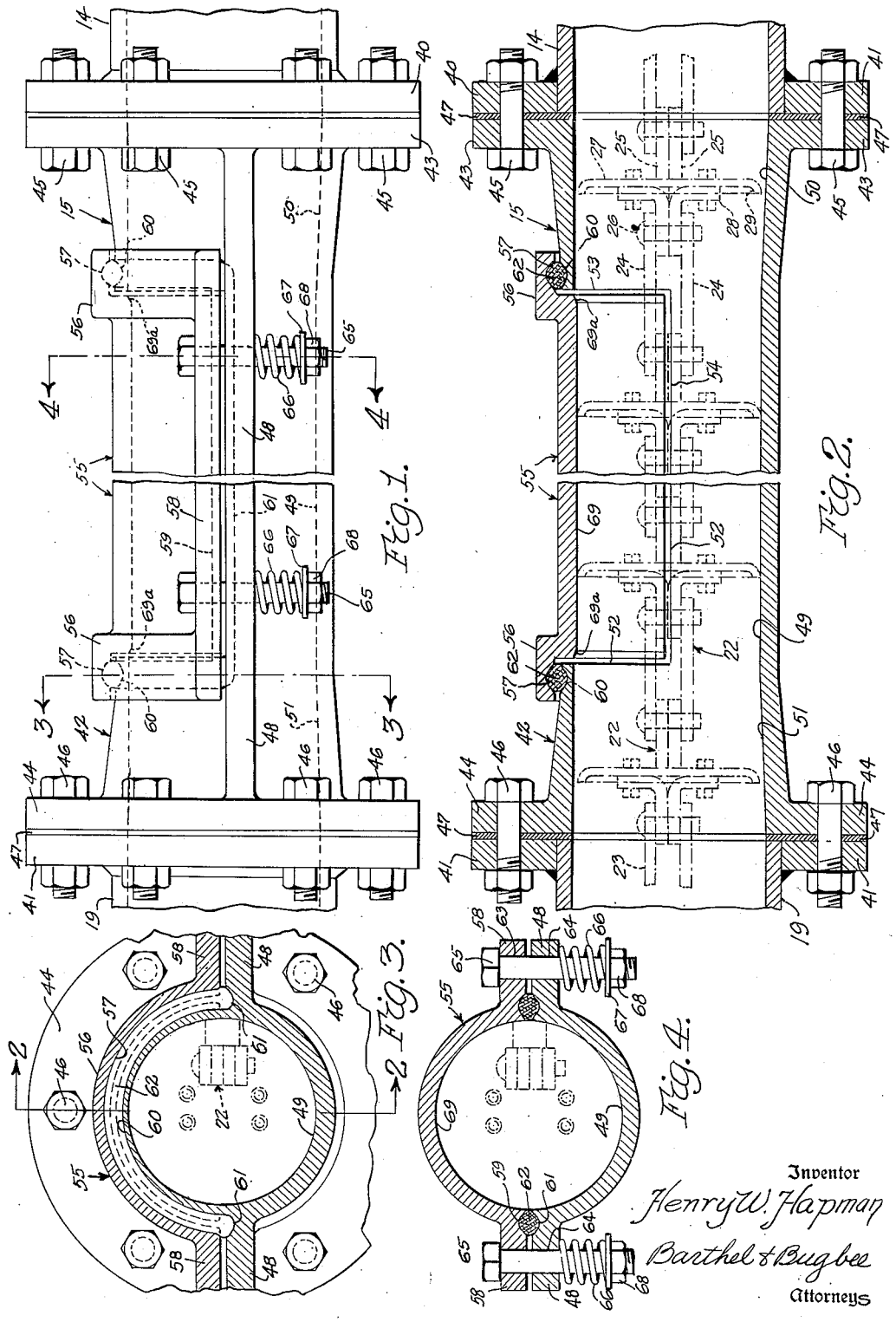
Inventor
Henry W. Hapman
Barthel & Bugbee
Attorneys

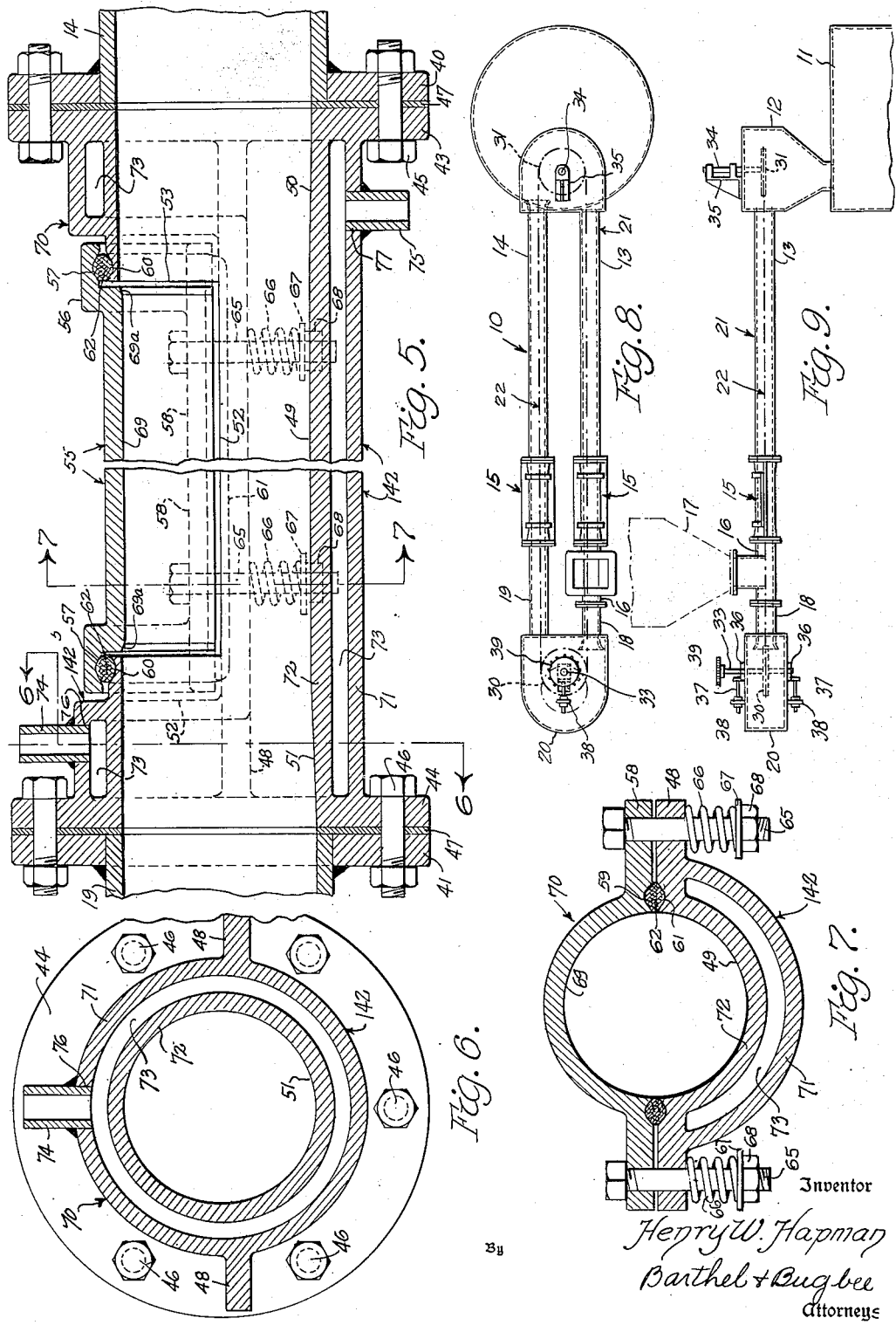

Patented July 10, 1951

2,559,616

UNITED STATES PATENT OFFICE 2,559,616

PRESSURE-SEALING APPARATUS FOR
FLIGHT CONVEYERS

Henry W. Hapman, Detroit, Mich., assignor of forty per cent to Hannah Jane Hapman, Detroit, Mich.

Application July 2, 1949, Serial No. 102,811

10 Claims. (Cl. 198—168)

This invention relates to conveyors and, in particular, to flight conveyors employed under high temperature conditions exceeding the safe working temperatures of rubber or synthetic rubber.

One object of this invention is to provide a flight conveyor installation and a pressure-sealing device therefor which is especially adapted to high operating temperatures and which will seal off a portion of the conveyor circuit against leakage into or out of either super-atmospheric or sub-atmospheric pressures existing in the sealed-off portion of the conveyor.

Another object is to provide a conveyor installation and sealing device therefor of the foregoing character, wherein provision is made for controllably relieving an excessive rise of pressure, such as from an explosion of the conveyed materials or from hard lumps of conveyed material or foreign matter which would otherwise cause a jam or stoppage of travel of the flight conveyor.

Another object is to provide a conveyor installation and sealing device therefor of the foregoing character wherein the sealing device is additionally liquid-cooled to increase its effective maximum working temperature.

Another object is to provide a conveyor installation and sealing device therefor of the foregoing character having a scraping device associated therewith for preventing building up of the material in front of the conveyor flights with a consequent rise in the resistance and in the power demand requirements of the conveyor.

In the drawings:

Figure 1 is a side elevation of a controllable pressure-sealing device for high temperature installations according to one form of the invention;

Figure 2 is a central longitudinal vertical section through the pressure-sealing device of Figure 1, taken along the line 2—2 in Figure 3;

Figure 3 is a cross-section taken along the line 3—3 in Figure 1;

Figure 4 is a cross-section taken along the line 4—4 in Figure 1;

Figure 5 is a central vertical longitudinal section through a modified pressure-sealing device having a liquid-cooling arrangement incorporated therein;

Figure 6 is a cross-section along the line 6—6 in Figure 5;

Figure 7 is a cross section along the line 7—7 in Figure 5;

Figure 8 is a top plan view of a high temperature pressure-sealed flight conveyor installation employing the sealing device shown in Figures 1 or 5; and Figure 9 is a side elevation of the flight conveyor installation shown in Figure 8.

The conveying of materials at temperatures beyond the safe temperatures for the use of rubber and synthetic rubber has hitherto been difficult because of the heat damage to resilient flights and other conveyor parts. The problem of conveying materials at high temperatures, such as from 400° F. to 1000° F. becomes still more difficult when it is desired to convey such materials into or out of a pressurized compartment or vessel, since the ordinary rubber or synthetic rubber sealing members will not safely stand such temperatures without rapid deterioration or even destruction.

The present invention solves these problems by providing a flight conveyor installation and a pressure-sealing device therefor which can be safely operated within the temperature range of 400° F. to 1000° F. under pressurized conditions either above or below atmospheric pressure and an effective seal obtained to prevent blowback or escape of pressure either into or out of the compartment or vessel being served. For this purpose, the invention provides a tubular member which is inserted in the flight conveyor conduit and which is divided in halves along a portion of its length, the divided portion being filled by a semi-cylindrical closure member which is yieldingly urged by springs into a sealing position. An effective seal is maintained at the joints between the closure member and the tubular member by sealing elements composed of silicone derivatives which elongate in cross-section when subjected to pressure and which thereby fill the cracks where escape of pressure or suction might otherwise occur.

This invention permits the use of metallic flights capable of standing higher temperatures than rubber or synthetic rubber flights. It also prevents "blow-by" of gases through the clearances between the conveyor flights and the inner wall of the conveyor conduit. The spring-urged closure also serves as a safety closure to harmlessly release the burning gases resulting from a possible explosion within the apparatus, thereby preventing damage to the apparatus which would otherwise occur. One form of the invention also provides a cooling jacket around the tubular member and within the walls thereof, a cooling liquid such as water being circulated through this jacket to reduce the temperature still further.

Referring to the drawings in detail, Figures 8 and 9 show a pressurized high temperature flight conveyor installation, generally designated 10 as installed to convey materials into or out of a material treating or storing vessel, compartment or apparatus 11, such as a lime kiln, chemical reaction apparatus, or the like. The apparatus 11 is shown in Figures 8 and 9 as provided with a material supply or discharge hopper 12 to which inlet and outlet conduits 13 and 14 respectively lead from and to pressure sealing devices 15 of substantially identical construction, thereby sealing off the conduits 13 and 14 from the material inlet conduit 16 and material inlet hopper 17 connected thereto. Conduits 18 and 19 lead to the conveyor drive housing 20.

The flight conveyor conduit assembly, generally designated 21 and consisting of the previously-mentioned conduits in assembly, contains an endless flight conveyor, generally designated 22. The latter is of any suitable type, the type shown in Figure 2 being supplied for purposes of illustration. The conveyor 22 as shown consists of an endless chain 23 of link construction including outer and inner links 24 and 25 pivotally interconnected by pivot pins 26. The inner links 25 pass through flight discs 27, the latter in turn being bolted to ears 28 which are struck out of the links 25 and bent transversely thereto. The flight discs 27 are shown as annularly curved or dished at their peripheries 29. The curved edge portions or tapered surface 29 serve as scrapers to prevent the building up of material in front of the flights, and are bent in the direction of travel of the conveyor.

The endless conveyor 22 is trained around and supported at the opposite ends of its run by driving and driven sprockets 30 and 31 respectively, mounted on vertical shafts 33 and 34. The shaft 34 is journaled in a vertical shaft hanger 35 and extends downward into the discharge hopper 12. The shaft 33, on the other hand, is journaled in slidable bearing blocks 36 which are in turn adjusted to and fro by screw shaft 37 mounted in stationary bearings 38 (Figure 9). By adjusting the screw shaft 37, the tension of the endless chain may be increased or lessened, as desired. The shaft 33 is driven in any suitable way, a sprocket 39 being illustrated by which it is connected to an electric motor (not shown).

Figures 1 to 4 inclusive show the sealing device 15 which is inserted between the conduit sections 14 and 19 which are provided with welded coupling fingers 40 and 41 respectively for that purpose. The sealing device 15 has a tubular casing 42 with end flanges 43 and 44 which are bolted as at 45 and 46 to the flanges 40 and 41, gaskets 47 inserted between these coupling flanges preventing leakage at the junction.

The casing 42 is provided on its opposite sides with diametrically opposite longitudinal ribs 48 extending between the coupling flanges 43 and 44 (Figures 1 and 4). The casing 42 is likewise provided with a longitudinal bore 49 of constant diameter with flared end portions 50 and 51 converging toward it from the coupling flanges 43 and 44 respectively. Thus, the peripheries 29 of the flights 27 have clearances between them and the flared bore portions 50 and 51 whereas they fit the straight bore portion 49 much more closely, as shown in Figure 2. The casing 42 is cut away as at 52 in its midportion, substantially down to the rib 48 on either side, the cutaway portion 52 having arcuate end portions 53 and straight portions 54 interconnecting them. Fitted into the cutaway portion 52 is a semi-cylindrical closure member 55 having semi-annular end bosses 56 with packing grooves 57 therein, and side ribs 58 extending parallel to the casing ribs 48 and having packing grooves 59 therein. The casing 42 and ribs 48 are likewise provided with interconnecting arcuate vacuum grooves 60 and 61 respectively (Figure 4) and these packing grooves are filled with an elongated sealing member 62 of a silicone derivative which is resilient yet is capable of withstanding much higher temperatures than natural or synthetic rubber. The sealing member 62 is normally of circular cross-section but is distorted into elongated cross-section under pressure.

The ribs 48 and 58 are bored as at 63 and 64 respectively to receive bolts 65. The bolts 65 carry compression springs 66 held in position by washers 67 and nuts 68 threaded onto the bolts 65. The springs 66 thus urge the closure member 55 downward against the sealing member 62, forcing this in turn into sealing engagement with the casing 42. At the same time, however, the springs 66 permit the closure member 55 to yield in an upward direction in the event that a lump of material forces one or more of the flights 27 upward against its approximately cylindrical inner surface 69. The latter is beveled at its opposite ends at as 69a. In the event of an explosion, the closure member 55 also flies upward to release the gas generated by the explosion.

*Liquid-cooled pressure-sealing device*

Figures 5 to 7 inclusive show a modified pressure-sealing device, generally designated 70, for flight conveyors in which a cooling liquid is circulated through chambers in the side walls of the casing. The construction of the sealing device 70 is otherwise very similar to that of the form of the invention shown in Figures 1 to 4 inclusive and corresponding parts are therefore similarly designated to avoid unnecessary duplication of description. The casing, designated 142 because of its general similarity to the casing 42, has outer and inner walls 71 and 72 respectively enclosing an annular cooling chamber 73. The cooling chamber 73 extends entirely around the casing 142 near its opposite ends, and is there provided with liquid inlet and outlet pipes 74 and 75 respectively welded into the bores or ports 76 and 77 (Figure 5). In its midportion, however, the cooling chamber 73 extends approximately but halfway around the casing 142 at the location where the closure member 55 is placed (Figure 7). In the majority of installations, the liquid chamber 73 is employed for cooling the pressure-sealing device 70 and its contents. Occasionally, however, where it is desired to conduct cooking or a chemical reaction within the conduit system 21, and where the heat supplied otherwise to the installation is inadequate, steam or other heating agent may be circulated through the chamber 73 in order to maintain the interior at the desired temperature.

*Operation*

In the operation of the invention, whether of the plain type of Figures 1 to 4 inclusive or of the chambered type shown in Figures 5 to 7 inclusive, the material to be conveyed and supplied to the material treating apparatus 11 is placed in the material inlet hopper 17, and the conveyor 22 is started in operation along its orbital path by applying power to the drive shaft 39 and drive sprocket 30. As the flights 27 move past the hopper 17, they pick up the material and carry it through the adjacent sealing device 15 and the conduit portion 13 into the discharge hopper 12. The conveyed material drops downward under the influence of gravity into the material treating apparatus 11 while the empty conveyor proceeds around the sprocket 31 into the return conduit portion 14, and thence through the second sealing device 15 (Figure 8) and the conduit portion 19 back to the drive sprocket 30, completing the circuit. The incoming material tends to cool the inlet conduit portions 16 and 13 and the first sealing device 15, hence the use of the liquid-cooled sealing device 70 is ordinarily unnecessary at this point. If the temperature within the material treating apparatus 11 is high, it heats the conveyor 22 as it passes around the sprocket 31 and consequently frequently heats the return conduit portion 14. Under these conditions, it is found desirable to install the liquid-cooled pressure-sealing device 70 in place of the second pressure-sealing device 15 (Figure 8), supplying enough cooling liquid to offset the heating effect and to equalize the expansion of the conduit system which otherwise takes place. Under high temperature conditions, if the outgoing or return portions 14, 19 of the conduit system 21 are not cooled in this manner, distortion thereof is likely to occur, interfering with the smooth operation of the system.

If, as is frequently the case, there is pressure within the material treating apparatus 11 higher than atmospheric pressure, the sealing devices 15 and 70 prevent loss of this pressure. This pressure will escape past the peripheries 29 of the flights 27 in the various conduit portions 13 and 14 since there is a considerable clearance between the flights and the inner surface of the conduit which is necessary to insure smooth and economical operation of the conveyor. The flights, as they pass through the pressure-sealing devices 15 or 70, however, fit the side walls thereof snugly and loss of pressure is thereby prevented. The springs 66 hold the closure member 55 snugly down against the flights, maintaining the sealing action, but permitting the closure member 55 to yield upward in the event of a building up of material or foreign matter at that point. In the event of an explosion, the closure member 55 will also yield upward and will therefore prevent the exploded gases from travelling beyond the sealing devices 15 or 70. Thus, this arrangement prevents an explosion from travelling through the conveyor conduit system to the incoming material, as it would in the case of a screw conveyor, and also provides for relief of pressure which would seriously damage a screw conveyor or an unprotected flight conveyor.

If the material conveyed tends to deposit itself as a coating upon the inner walls 49 of the conveyor sealing device casing 42, such as in the case of zinc oxide, the dished or curved peripheries 29 of the flights 27 serve as scrapers since they project outward from the flights 27 in the direction of travel of the conveyor. The conveyor installation 10 is adapted to the handling of a wide variety of materials, such as lime to a lime kiln, fly ash from the firebox of a boiler, catalysts to a chemical reaction apparatus and pharmaceutical or food products to material treating vessels or apparatus of that type.

What I claim is:

1. A pressure-sealing apparatus for flight conveyors with substantially circular disc flights comprising a tubular casing adapted to be installed in the conveyor conduit and having a bore therethrough with a substantially straight cylindrical central portion of substantially constant diameter and a flared end portion converging toward said central portion, said casing having an opening in the wall thereof, a closure member for said opening configured to fit the flights of said flight conveyor, and a resilient element yieldingly urging said closure member into closing relationship with said opening and also into sealing engagement with the peripheries of said conveyor flights.

2. A pressure-sealing apparatus for flight conveyors with substantially circular disc flights comprising a tubular casing adapted to be installed in the conveyor conduit and having a bore therethrough with a substantially straight cylindrical central portion of substantially constant diameter and a flared end portion converging toward said central portion, said casing having an opening in the wall thereof, a closure member for said opening configured to fit the flights of said flight conveyor, and a resilient element yieldingly urging said closure member into closing relationship with said opening and also into sealing engagement with the peripheries of said conveyor flights, said casing and said closure member having transversely projecting portions disposed adjacent one another, said resilient element engaging one of said projecting portions.

3. A pressure-sealing apparatus for flight conveyors with substantially circular disc flights comprising a tubular casing adapted to be installed in the conveyor conduit and having a bore therethrough with a substantially straight cylindrical central portion of substantially constant diameter and a flared end portion converging toward said central portion, said casing having an opening in the wall thereof, a closure member for said opening configured to fit the flights of said flight conveyor, and a plurality of spaced resilient elements yieldingly urging said closure member into closing relationship with said opening and also into sealing engagement with the peripheries of said conveyor flights, said casing and said closure member having longitudinally extending projections adjacent their meeting edges and said resilient elements engaging one of said projections and urging it toward the other projection.

4. A pressure-sealing apparatus for flight conveyors with substantially circular disc flights comprising a tubular casing adapted to be installed in the conveyor conduit and having a bore therethrough with a substantially straight cylindrical central portion of substantially constant diameter and a flared end portion converging toward each end of said central portion, said casing having an opening in the wall thereof, a closure member for said opening configured to fit the flights of said flight conveyor, and a resilient element yieldingly urging said closure member into closing relationship with said opening and also into sealing engagement with the peripheries of said conveyor flights, said casing and said closure member having co-extensive substantially cylindrical inner wall surfaces snugly engageable with the flights of said flight conveyor.

5. A pressure-sealing apparatus for flight conveyors with substantially circular disc flights comprising a tubular casing adapted to be installed in the conveyor conduit and having a bore therethrough with a substantially straight cylindrical central portion of substantially constant diameter and a flared end portion converging toward said central portion, said casing having an opening in the wall thereof, a closure member for said opening configured to fit the flights of said flight conveyor, a resilient element yieldingly urging said closure member into closing relationship with said opening and also into sealing engagement with the peripheries of said conveyor flights, and an elongated yielding sealing element disposed between the opposed faces of said casing and closure member near the periphery of said closure member.

6. A pressure-sealing apparatus for flight conveyors with substantially circular disc flights comprising a tubular casing adapted to be installed in the conveyor conduit and having a bore therethrough with a substantially straight cylindrical central portion of substantially constant diameter and a flared end portion converging toward said central portion, said casing having an opening in the wall thereof, a closure member for said opening configured to fit the flights of said flight conveyor, a resilient element yieldingly urging said closure member into closing relationship with said opening and also into sealing engagement with the peripheries of said conveyor flights, and an elongated yielding sealing element of normally approximately circular cross-section disposed between the opposed faces of said casing and closure member near the periphery of said closure member.

7. A pressure-sealing apparatus for flight conveyors comprising a tubular casing adapted to be installed in the conveyor conduit and having an opening in the wall thereof, a closure member for said opening configured to fit the flights of said flight conveyor, a resilient element yieldingly urging said closure member into closing relationship with said opening, the periphery of said closure member and the adjacent wall portion of said casing having opposed grooves extending therearound, and an elongated yielding sealing element disposed in said groove.

8. A pressure-sealing apparatus for flight conveyors comprising a tubular casing adapted to be installed in the conveyor conduit and having an opening in the wall thereof, a closure member for said opening configured to fit the flights of said flight conveyor, a resilient element yieldingly urging said closure member into closing relationship with said opening, the periphery of said closure member and the adjacent wall portion of said casing having opposed grooves extending therearound, and an elongated yielding sealing element of silicone material disposed in said groove.

9. A pressure-sealing apparatus for flight conveyors with substantially circular disc flights comprising a tubular casing adapted to installed in the conveyor conduit and having a bore therethrough with a substantially straight cylindrical central portion of substantially constant diameter and a flared end portion converging toward said central portion, said casing having an approximately semi-cylindrical opening in the wall thereof, an approximately semi-cylindrical closure member for said opening configured to fit the flights of said flight conveyor, and a resilient element yieldingly urging said closure member into closing relationship with said opening and also into sealing engagement with the peripheries of said conveyor flights.

10. A pressure-sealing apparatus for flight conveyors with substantially circular disc flights comprising a tubular casing adapted to be installed in the conveyor conduit and having a bore therethrough with a substantially straight cylindrical central portion of substantially constant diameter and a flared end portion converging toward said central portion, said casing having an approximately semi-cylindrical opening in the wall thereof, an approximately semi-cylindrical closure member for said opening configured to fit the flights of said flight conveyor, and a resilient element yieldingly urging said closure member into closing relationship with said opening and also into sealing engagement with the peripheries of said conveyor flights, said casing and said closure member having substantially parallel longitudinal ridges adjacent the periphery of said closure member, and said resilient element being mounted in engagement with one of said ridges.

HENRY W. HAPMAN.

REFERENCES CITED

The following references are of record in the file of this patent:

UNITED STATES PATENTS

| Number | Name | Date |
|---|---|---|
| 1,006,260 | Mueller et al. | Oct. 17, 1911 |
| 1,048,019 | Wilson | Dec. 24, 1912 |
| 1,184,151 | Tulley | May 23, 1916 |
| 1,235,406 | Williams | July 31, 1917 |
| 1,317,565 | Famoso et al. | Sept. 30, 1919 |
| 1,554,275 | Good | Sept. 22, 1925 |
| 1,630,071 | Offenhauser | May 24, 1927 |
| 2,122,399 | Abbe | July 5, 1938 |
| 2,420,217 | Allen | May 6, 1947 |